(12) United States Patent
Chang

(10) Patent No.: US 8,083,289 B2
(45) Date of Patent: Dec. 27, 2011

(54) ADJUSTING STRUCTURE FOR A SEAT TUBE OF A BICYCLE

(75) Inventor: Bo Liang Chang, Changhua Hsien (TW)

(73) Assignee: Liow Ko Co., Ltd., Changhua Hsien (TW)

( * ) Notice: Subject to any disclaimer, the term of this patent is extended or adjusted under 35 U.S.C. 154(b) by 327 days.

(21) Appl. No.: 12/411,758

(22) Filed: Mar. 26, 2009

(65) Prior Publication Data

US 2010/0244509 A1   Sep. 30, 2010

(51) Int. Cl.
*B62J 1/00* (2006.01)

(52) U.S. Cl. .............................. 297/215.15; 297/215.14

(58) Field of Classification Search ............. 297/215.14, 297/215.13, 215.15, 195.1
See application file for complete search history.

(56) References Cited

U.S. PATENT DOCUMENTS

| | | | | |
|---|---|---|---|---|
| 2,476,226 A * | 7/1949 | Schwinn | ................. | 297/215.15 |
| 4,387,925 A * | 6/1983 | Barker et al. | ................. | 297/201 |
| 5,295,727 A * | 3/1994 | Kao | .......................... | 297/215.14 |
| 5,333,826 A * | 8/1994 | Lai | ............................ | 248/229.14 |
| 5,921,625 A * | 7/1999 | Muser | ....................... | 297/215.15 |
| 5,988,741 A * | 11/1999 | Voss et al. | ................ | 297/215.15 |
| 6,007,148 A * | 12/1999 | Yu | ................................ | 297/195.1 |
| 6,561,579 B1 * | 5/2003 | Weir | ........................... | 297/195.1 |
| 7,431,391 B2 * | 10/2008 | Hsiao | ........................ | 297/215.15 |
| 7,681,947 B2 * | 3/2010 | Ritchey | ..................... | 297/215.14 |
| 2002/0166941 A1 * | 11/2002 | Dunlap | ......................... | 248/599 |
| 2005/0200170 A1 * | 9/2005 | Liao | ........................... | 297/215.15 |
| 2007/0164590 A1 * | 7/2007 | Hsiao | ....................... | 297/215.15 |

* cited by examiner

*Primary Examiner* — David Dunn
*Assistant Examiner* — Erika Garrett

(57) ABSTRACT

An adjusting structure for a seat tube of a bicycle includes a seat tube, two engaging blocks, two cover members, and a locking unit, wherein two engaging blocks are symmetrically provided on two sides of a positioning seat of the seat tube, and the engaging blocks engages with each other by using the positioning seat, the two cover members are symmetrically fixed on outer sides of the two engaging blocks, and a locking unit laterally passes through the above-mentioned components and allows to be alternatively rotated tightly or loosely, thereby adjusting a saddle to become inclined and to move forward and backward easily.

14 Claims, 4 Drawing Sheets

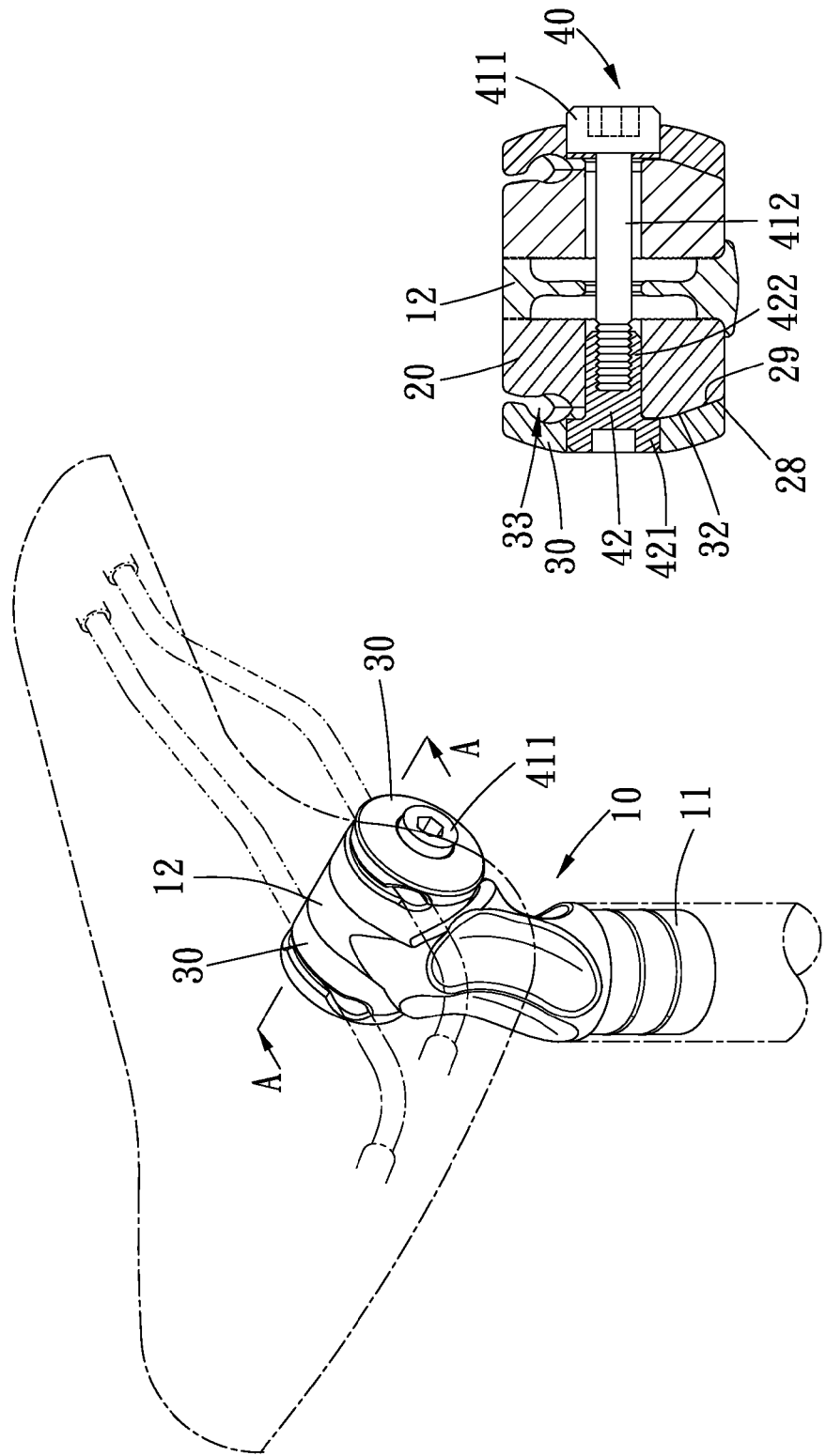

ADJUSTING STRUCTURE FOR A SEAT TUBE OF A BICYCLE

BACKGROUND OF THE INVENTION

1. Field of the Invention

The present invention relates to a seat tube of a bicycle.

2. Description of the Prior Art

A conventional saddle of a bicycle can be adjusted to become inclined or to move forward and backward by using an adjusting structure fixed on a seat tube.

However, such a conventional adjusting structure is complicated, operated inconveniently, and not strength enough.

The present invention has arisen to mitigate and/or obviate the afore-described disadvantages.

SUMMARY OF THE INVENTION

The primary object of the present invention is to provide an adjusting structure for a seat tube of a bicycle that can simplify its related components.

A further object of the present invention is to provide an adjusting structure for a seat tube of a bicycle that can reinforce its strength.

Another object of the present invention is to provide an adjusting structure for a seat tube of a bicycle that can adjust a saddle to become inclined and to move forward and backward easily.

An adjusting structure for a seat tube of a bicycle in accordance with the present invention comprises:

a seat tube including a cylinder-shaped positioning seat integrally formed on an upper side thereof, the positioning seat including two annular toothed disks integrally formed on two sides thereof respectively, and each annular toothed disk including a first through hole laterally arranged at a central portion thereof;

two engaging blocks symmetrically provided on two sides of the positioning seat, and each engaging block including an internal side surface and an external side surface, on the internal side surface being integrally formed an annular toothed member corresponding to the annular toothed disk, and each engaging block including a second through hole laterally formed at a central portion thereof;

two cover members symmetrically fixed on outer sides of the two engaging blocks, and each cover member including an inner surface and an outer surface, between the inner surface of the cover member and the external side surface of the cover member being defined with a fixing bore, at two sides of which is formed an opening, to receive a fixed rod under a saddle, each cover member further including a third through hole laterally formed at a central portion thereof;

a locking unit laterally passing through the first, the second, and the third through holes and allowing to be alternatively rotated tightly or loosely;

wherein as the locking unit is in a tightly rotated state, the relative positions among the positioning seat, the two engaging blocks, and the two cover members are fixed, and the fixed rod of the saddle allows to be secured in the fixing bore;

wherein as the locking unit is in a loosely rotated state, the engaging blocks are rotated along the locking unit, and a distance of the engaging block corresponding to the cover member is increased so that the fixed rod of the saddle can have enough space to slide straightly along the fixing bore.

BRIEF DESCRIPTION OF THE DRAWINGS

FIG. 2 is an assembly view of the adjusting structure for the seat tube of the bicycle in accordance with the present invention;

FIG. 3 is a cross sectional view taken along the line of A-A of FIG. 2;

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
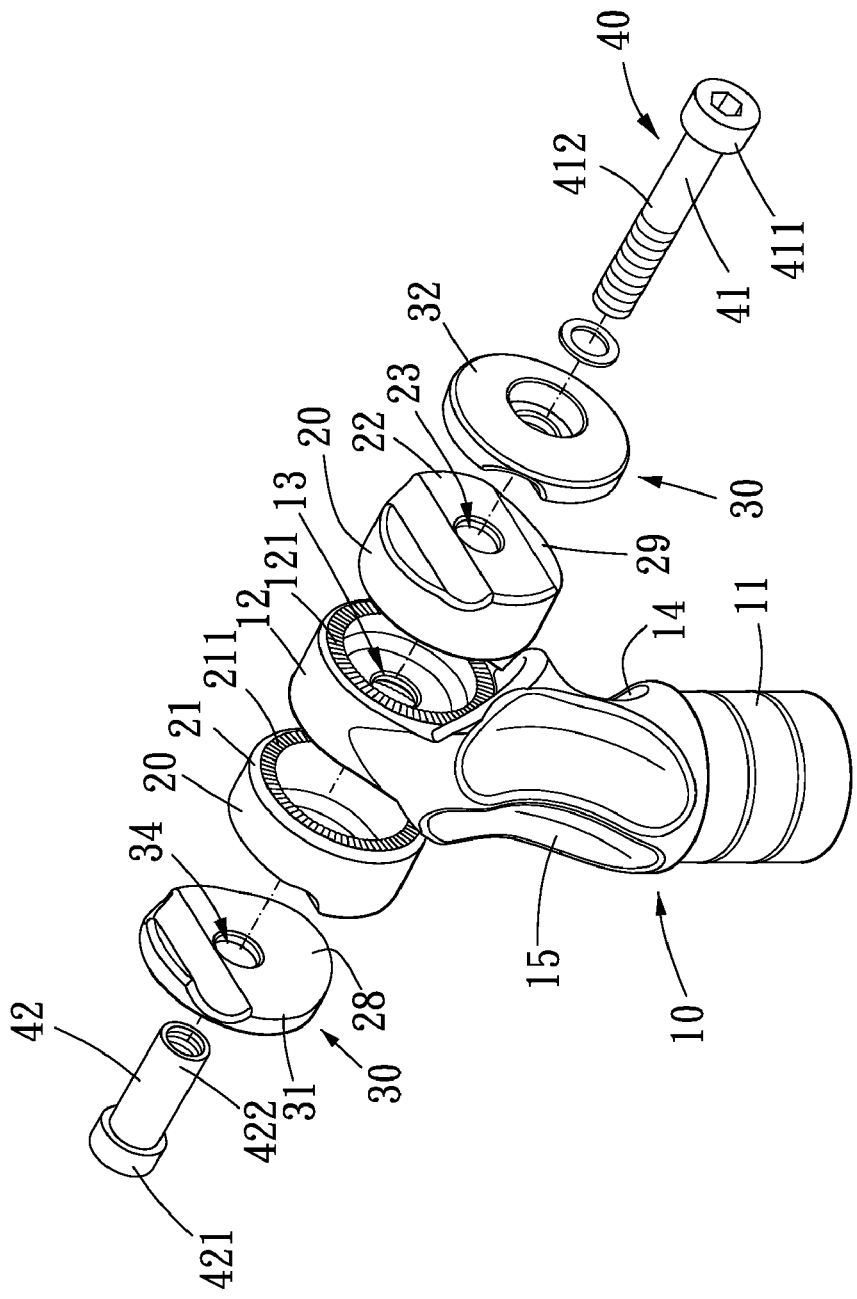
FIG. 1 is a perspective view of an adjusting structure for a seat tube of a bicycle in accordance with one embodiment of the present invention.

Referring to FIGS. 1-3, an adjusting structure for a seat tube of a bicycle in accordance with the present invention comprises: a seat tube 10, two cylinder-shaped engaging blocks 20, two cover members 30, and a locking unit 40; wherein the seat tube 10 includes a circular post 11 disposed on a lower side thereof to combine with a stem of the bicycle, and includes a cylinder-shaped positioning seat 12 integrally formed on an upper side thereof, the positioning seat 12 includes two annular toothed disks 121 integrally formed on two sides thereof respectively, and each annular toothed disk 121 includes a first through hole 13 laterally arranged at a central portion thereof. The seat tube 10 further includes two laterally symmetrical first cavities 14 fixed at a front side thereof and two laterally symmetrical second cavities 15 affixed at a rear side thereof so that the first and the second cavities 14, 15 can be securely gripped by a rider during assembly.

The engaging blocks 20 are symmetrically provided on two sides of the positioning seat 12, and each includes an internal side surface 21 and an external side surface 22. On the internal side surface 21 is integrally formed an annular toothed member 211 corresponding to the annular toothed disk 121. Specifically, on the annular toothed disk 121 and the annular toothed member 211 are arranged a plurality of peripheral teeth which are formed in a triangle or an actuate-wave shape or arranged a number of radially extending ribs to tightly engage the annular toothed disk 121 with the annular toothed member 211 together. Besides, each engaging block 20 includes a second through hole 23 laterally formed at a central portion thereof.

The two cover members 30 are symmetrically fixed on outer sides of the two engaging blocks 20, and each cover member 30 includes an inner surface 31 and an outer surface 32, between the inner surface 31 of the cover member 30 and the external side surface 22 of the engaging block 20 is defined with a fixing bore 33, at two sides of which are formed an opening, to receive a fixed rod under a saddle. Furthermore, each cover member 30 further includes a third through hole 34 laterally formed at a central portion thereof.

Figure 1A:
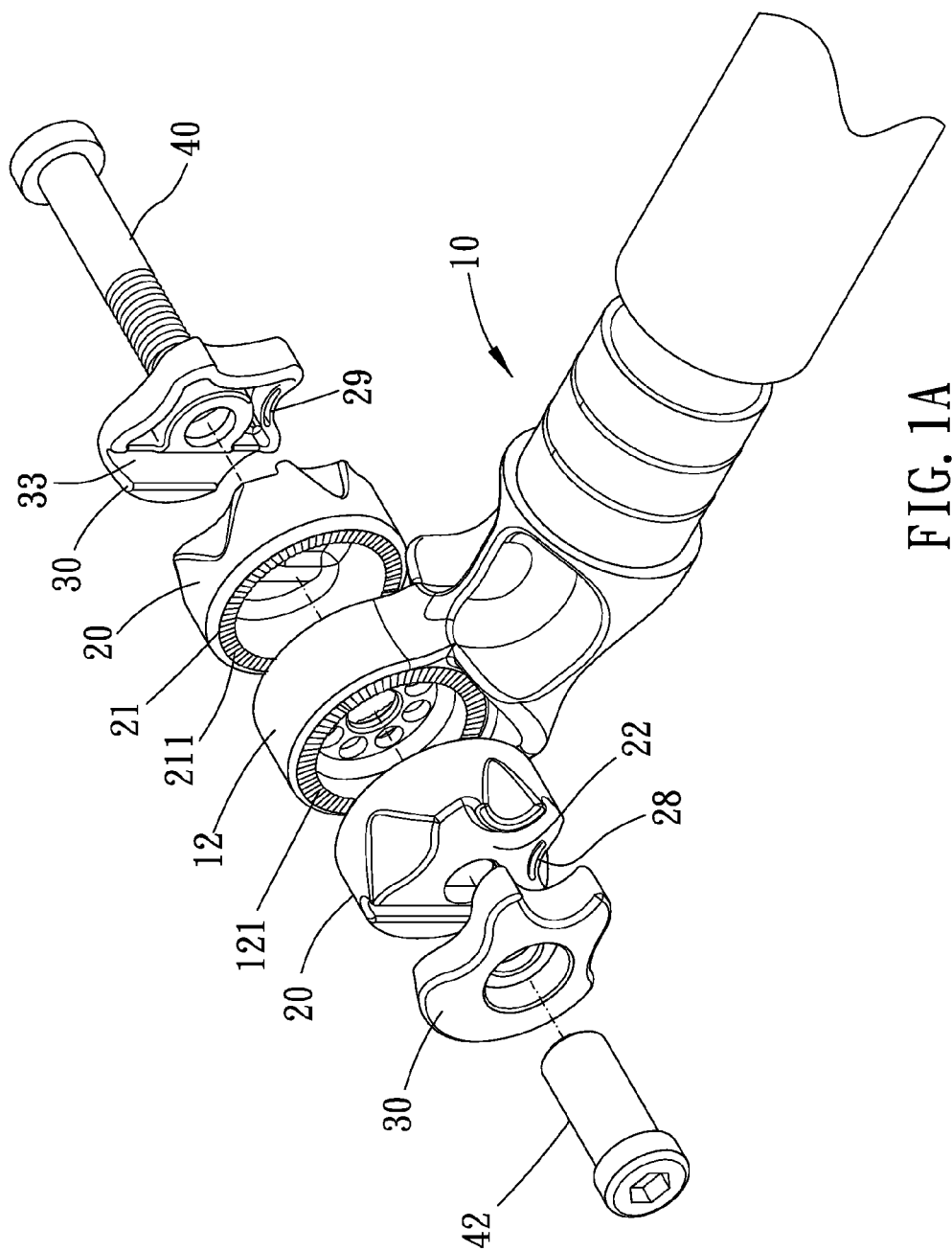
FIG. 1A is a perspective view of the adjusting structure for the seat tube of the bicycle in accordance with another embodiment of the present invention.

Between the engaging block 20 and the cover member 30 corresponding to the engaging block 20 is defined with a positioning structure to prevent the engaging block 20 from rotation relative to the cover member 30. The positioning structure includes a projection 28 and a recessed portion 29 corresponding to the projection 28. In this embodiment of the present invention, the projection 28 is formed in an arc shape and fixed on the inner surface 31 of the cover member 30, and the recessed portion 29 is disposed on the external side surface 22 of the engaging block 20. The above-mentioned recessed portion and the projection are not limited in a certain shape expect for radially fixing the through hole at the centers thereof. As shown in FIG. 1A, in another embodiment of the present invention, the shapes of the engaging block 20 and the cover member 30 each other, and the engaging block 20 and the cover member 30 are combined together to form a successive groove so that the user forces onto the groove by his fingers, and the projection 28 is fixed in at least one peripheral position of the external side surface 22 of the engaging block 20, the projection 28 is not formed in a concentric arc shape with the second through hole 23. The recessed portion 29 is mounted in at least one peripheral position of the inner surface 31 of the cover member 30, and the shape of the recessed portion 29 corresponds to that of the projection 28, such that the engaging block 20 will not rotate relative to the cover member 30. Moreover, the engaging block 20 and the cover member 30 can be further formed in a partial hollow shape to lower weight and manufacturing material.

The locking unit 40 laterally passes through the first, the second, and the third through holes 13, 23, and 34, and includes a hexagonal (or polygonal) screw 41 and a bolt sleeve 42, wherein the bolt sleeve 42 can be replaced with a nut. The hexagonal screw 41 and the bolt sleeve 42 are individually fitted into the through holes from the outer surfaces 32 of the two cover members 30 to screw with each other. Specifically, the hexagonal screw 41 includes a nut 411 and a screwed bolt 412, the bolt sleeve 42 includes a head 421 and a cylinder segment 422 with inner threads formed therein, such that the screwed bolt 412 can screw with the cylinder segment 422.

For safety, the outer rims of the nut 411 of the hexagonal screw 41 and the head 421 of the bolt sleeve 42 are formed in a circle shape, and at lease one of the nut 411 and the head 421 can be inserted into the third through hole 34. The third through hole 34 is designed in a step shape, and an diameter of the third through hole 34 proximate to the inner surface 31 is smaller than that of the third through hole 34 proximate to the outer surface 32. Optimally, sizes of the nut 411 and the head 421 are smaller than a diameter of the third through hole 34 proximate to the outer surface 32 but larger than another diameter of the third through hole 34 proximate to of the inner surface 31, such that the nut 411 and the head 421 can be inserted into the third through hole 34 from the outer surface 32 of the cover member 30.

Besides, the locking unit 40 can be rotated tightly or loosely.

As the locking unit 40 is in a tightly rotated state, the relative positions among the positioning seat 12, the two engaging blocks 20, and the two cover members 30 are fixed. Specifically, the annular toothed disk 121 of the positioning seat 12 tightly engages with the annular toothed member 211 of the engaging block 20, and the positioning structure between the engaging block 20 and the cover member 30 is securely locked, such that the fixed rod of the saddle allows to be secured in the fixing bore 33 without movement.

Figure 4:
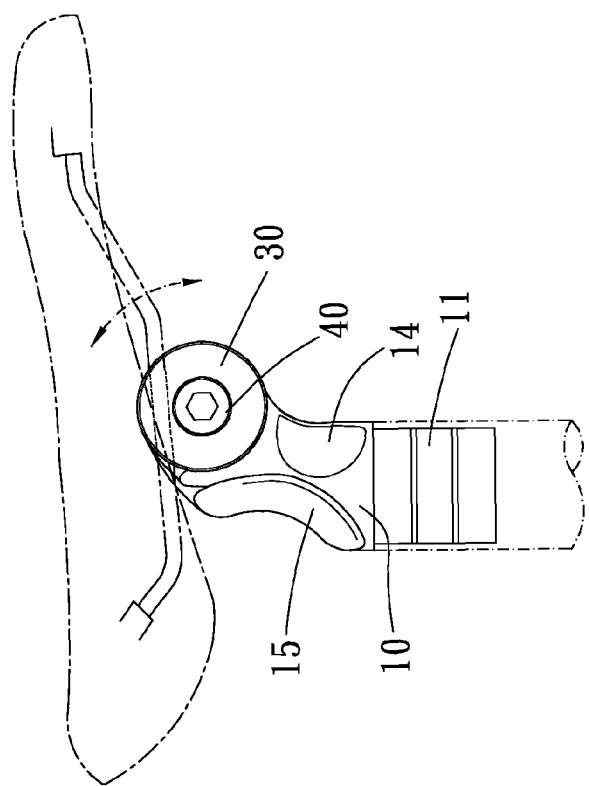
FIG. 4 is a side plan view illustrating the adjusting structure of a saddle being in a loosely rotated state.
Figure 5:
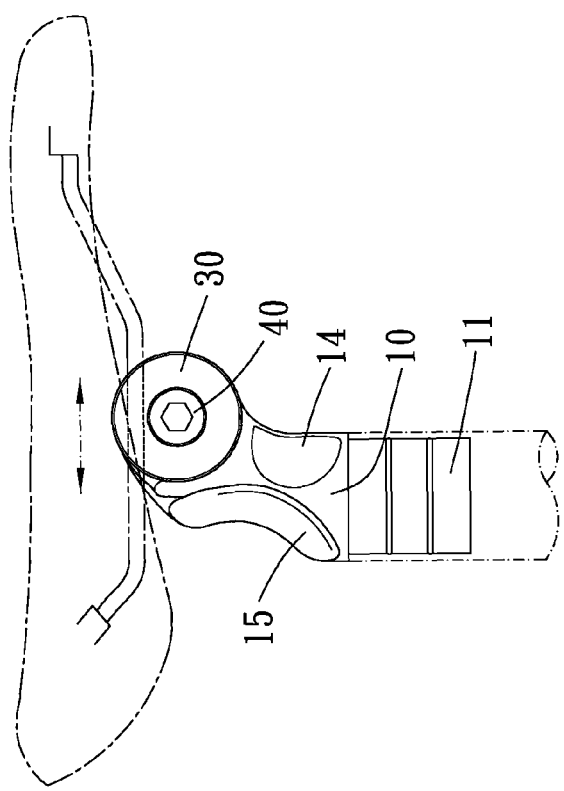
FIG. 5 is another side plan view illustrating the adjusting structure of the saddle being in a loosely rotated state.

As the locking unit 40 is in a loosely rotated state, the annular toothed disk 121 does not engage with the annular toothed member 211, but the engaging blocks 20 are rotated about the locking unit 40 as illustrated in FIG. 4 to adjust an inclined angle of the saddle, simultaneously, because a distance of the engaging block 20 corresponding to the cover member 30 is increased, the fixed rod of the saddle can have enough space to slide along the fixing bore 33 as shown in FIG. 5.

It is apparent form the above description that the present invention has the following advantages:

1. The related components of the adjusting structure can be reduced to easily combine together, lowering production cost.
2. The locking unit is provided to adjust the angle of the saddle and to move the saddle back and forth, thus simplifying operation.
3. The positioning seat is integrally formed with the seat tube to save assembly time and to reinforce the strength of the adjusting structure.
4. The locking elements are arranged in an insertable manner to reduce the size of the adjusting structure.

While we have shown and described various embodiments in accordance with the present invention, it is clear to those skilled in the art that further embodiments may be made without departing from the scope of the present invention.

What is claimed is:

1. An adjusting structure for a seat tube of a bicycle comprising:
    a seat tube including a cylinder-shaped positioning seat integrally formed on an upper side thereof, the positioning seat including two annular toothed disks integrally formed on two sides thereof respectively, and each annular toothed disk including a first through hole laterally arranged at a central portion thereof;
    two cylinder-shaped engaging blocks symmetrically provided on two sides of the positioning seat, and each engaging block including an internal side surface and an external side surface, on the internal side surface being integrally formed an annular toothed member in response to corresponding to the annular toothed disk, and each engaging block including a second through hole horizontally mounted laterally formed at a central portion thereof;
    two cover members symmetrically fixed on outer sides of the two engaging blocks, and each cover member including an inner surface and an outer surface, between the inner surface of the cover member and the external side surface of the engaging block being defined with a fixing bore, at two sides of which is formed an opening, to receive a fixed rod under a saddle, each cover member further including a third through hole laterally formed at a central portion thereof;
    a locking unit laterally passing through the first, the second, and the third through holes and allowing to be alternatively rotated tightly or loosely;
    wherein as the locking unit is in a tightly rotated state, the relative positions among the positioning seat, the two engaging blocks, and the two cover members are fixed, and the fixed rod of the saddle allows to be secured in the fixing bore;
    wherein as the locking unit is in a loosely rotated state, the engaging blocks are rotated along about the locking unit, and a distance of the engaging block in response to corresponding to the cover member is increased so that the fixed rod of the saddle can obtain an have enough space to slide straightly along the fixing bore;
    wherein between the engaging block and the cover member in response to corresponding to the engaging block is defined with a positioning structure to prevent the engaging block from rotation relative to the cover member, the positioning structure includes a projection and a recessed portion in response to corresponding to the projection.

2. The adjusting structure for the seat tube of the bicycle as claimed in claim 1, wherein the seat tube further includes two laterally symmetrical first cavities and two laterally symmetrical second cavities so that the first and the second cavities can be securely gripped by a rider.

3. The adjusting structure for the seat tube of the bicycle as claimed in claim 2, wherein the locking unit includes a screw and a bolt sleeve, the screw and the bolt sleeve are individually fitted into the first, the second, and the third through holes from the outer surfaces of the two cover members to screw with each other.

4. The adjusting structure for the seat tube of the bicycle as claimed in claim 3, wherein the third through hole of the cover member is designed in a step shape, and an diameter of the third through hole proximate to the inner surface is smaller than another diameter of the third through hole proximate to the outer surface, and the screw includes a nut and a screwed bolt, the bolt sleeve includes a head and a cylinder segment with inner threads formed therein, such that the nut and the head can be inserted into the third through hole of the cover member, and the screwed bolt can screw with the cylinder segment.

5. The adjusting structure for the seat tube of the bicycle as claimed in claim 4, wherein sizes of the nut and the head are smaller than a diameter of the third through hole proximate to the outer surface but more larger than another diameter of the third through hole proximate to of the inner surface.

6. The adjusting structure for the seat tube of the bicycle as claimed in claim 1, wherein the locking unit includes a screw and a bolt sleeve, the screw and the bolt sleeve are individually fitted into the first, the second, and the third through holes from the outer surfaces of the two cover members to screw with each other.

7. The adjusting structure for the seat tube of the bicycle as claimed in claim 6, wherein the third through hole of the cover member is designed in a step shape, and an diameter of the third through hole proximate to the inner surface is smaller than another diameter of the third through hole proximate to the outer surface, and the screw includes a nut and a screwed bolt, the bolt sleeve includes a head and a cylinder segment with inner threads formed therein, such that the nut and the head can be inserted into the third through hole of the cover member, and the screwed bolt can screw with the cylinder segment.

8. The adjusting structure for the seat tube of the bicycle as claimed in claim 7, wherein the screw is a polygonal screw.

9. The adjusting structure for the seat tube of the bicycle as claimed in claim 7, wherein sizes of the nut and the head are smaller than a diameter of the third through hole proximate to the outer surface but more larger than another diameter of the third through hole proximate to of the inner surface.

10. An adjusting structure for a seat tube of a bicycle comprising:
a seat tube including a cylinder-shaped positioning seat integrally formed on an upper side thereof, the positioning seat including two annular toothed disks integrally formed on two sides thereof respectively, and each annular toothed disk including a first through hole laterally arranged at a central portion thereof;
two cylinder-shaped engaging blocks symmetrically provided on two sides of the positioning seat, and each engaging block including an internal side surface and an external side surface, on the internal side surface being integrally formed an annular toothed member in response to corresponding to the annular toothed disk, and each engaging block including a second through hole horizontally mounted laterally formed at a central portion thereof;
two cover members symmetrically fixed on outer sides of the two engaging blocks, and each cover member including an inner surface and an outer surface, between the inner surface of the cover member and the external side surface of the engaging block being defined with a fixing bore, at two sides of which is formed an opening, to receive a fixed rod under a saddle, each cover member further including a third through hole laterally formed at a central portion thereof;
a locking unit laterally passing through the first, the second, and the third through holes and allowing to be alternatively rotated tightly or loosely;
wherein as the locking unit is in a tightly rotated state, the relative positions among the positioning seat, the two engaging blocks, and the two cover members are fixed, and the fixed rod of the saddle allows to be secured in the fixing bore;
wherein as the locking unit is in a loosely rotated state, the engaging blocks are rotated along about the locking unit, and a distance of the engaging block in response to corresponding to the cover member is increased so that the fixed rod of the saddle can obtain an have enough space to slide straightly along the fixing bore;
wherein the seat tube further includes two laterally symmetrical first cavities and two laterally symmetrical second cavities so that the first and the second cavities can be securely gripped by a rider.

11. The adjusting structure for the seat tube of the bicycle as claimed in claim 10, wherein the locking unit includes a screw and a bolt sleeve, the screw and the bolt sleeve are individually fitted into the first, the second, and the third through holes from the outer surfaces of the two cover members to screw with each other.

12. The adjusting structure for the seat tube of the bicycle as claimed in claim 11, wherein the third through hole of the cover member is designed in a step shape, and an diameter of the third through hole proximate to the inner surface is smaller than another diameter of the third through hole proximate to the outer surface, and the screw includes a nut and a screwed bolt, the bolt sleeve includes a head and a cylinder segment with inner threads formed therein, such that the nut and the head can be inserted into the third through hole of the cover member, and the screwed bolt can screw with the cylinder segment.

13. The adjusting structure for the seat tube of the bicycle as claimed in claim 12, wherein the screw is a polygonal screw.

14. The adjusting structure for the seat tube of the bicycle as claimed in claim 12, wherein sizes of the nut and the head are smaller than a diameter of the third through hole proximate to the outer surface but more larger than another diameter of the third through hole proximate to of the inner surface.

* * * * *